United States Patent Office.

WILLIAM L. POTTER, OF NEWARK, NEW JERSEY.

*Letters Patent No.* 46,495, *dated February* 21, 1865; *reissue No.* 2,684, *dated July* 16, 1867.

IMPROVED COMPOSITION FOR ROOFING AND FOR OTHER PURPOSES.

The Schedule referred to in these Letters Patent and making part of the same.

TO ALL WHOM IT MAY CONCERN:

Be it known that I, WILLIAM L. POTTER, of Newark in the county of Essex, and State of New Jersey, formerly of Clifton Park, in the county of Saratoga, and State of New York, have invented a new and improved Composition for Roofing, Covering the Sides of Buildings, Boat-Decks, Boat-Bottoms, &c.; and I do hereby declare that the following is a full, clear, and exact description thereof, which will enable others skilled in the art to make and use the same.

My invention has for its object to furnish an improved composition for roofing and similar uses, which shall be of such a nature that when exposed to solar or artificial heat it will harden into a solid body of slate, and it consists in the use of slate or argillaceous rock for roofing and similar purposes.

In carrying my invention into practice I take what is generally known as slate or argillaceous rock, also called schist, shale, &c. It is not necessary that it should be slaty in its structure, as that which breaks in cubes or fractures irregularly will answer the purpose equally as well, provided it is argillaceous. It is necessary that the rock should possess this peculiarity in order to produce the desired result. The rock should be reduced to a fine powder and mixed with any suitable glutinous or viscous material, such as coal-tar, gas-tar, oil, paint, &c., in such quantities that it may be easily spread with a brush or trowel.

When used for roofing the mixture should be of the consistency of plasterer's mortar, which may be applied to felt, paper, canvas, &c., with a stiff brush or trowel, either before or after the felt, paper, canvas, &c., has been applied to the roof or building. When used for covering the sides of buildings, boat-decks, boat-bottoms, &c., the mixture should be of the consistency of thick paint, and may be applied with a paint or roofing-brush.

The advantage of this composition or mixture over all others of a similar nature is, that instead of softening or running upon exposure to the rays of the sun, or to artificial heat, it hardens, or in other words petrifies, until it becomes a solid body of slate.

Having thus described my invention, what I claim as new, and desire to secure by Letters Patent, is—

The use of the above-described rock as and for the purposes specified.

The above specification of my invention signed by me this 11th day of June.

WM. L. POTTER.

Witnesses:

WM. F. MCNAMARA,

JAMES T. GRAHAM.